May 5, 1942.  C. J. GOESKE  2,282,222
MOTOR VEHICLE WHEEL
Filed June 27, 1940  4 Sheets-Sheet 1
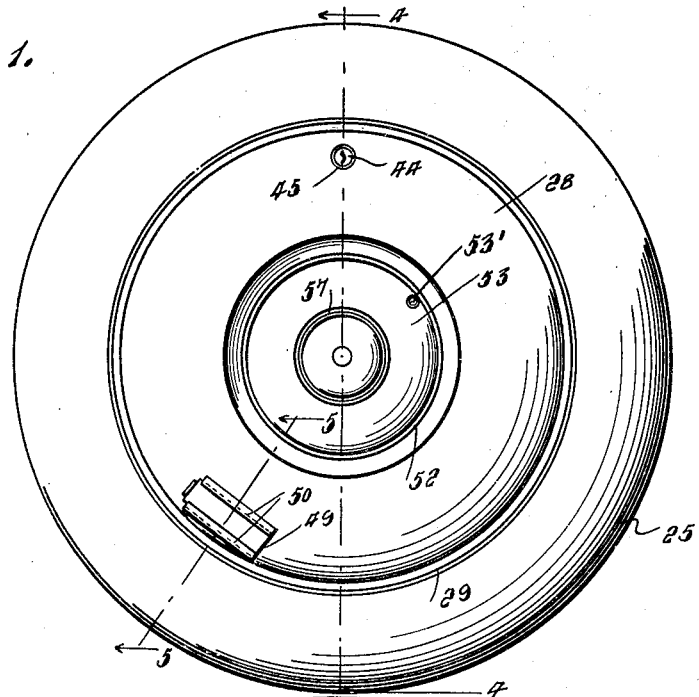
Fig. 1.
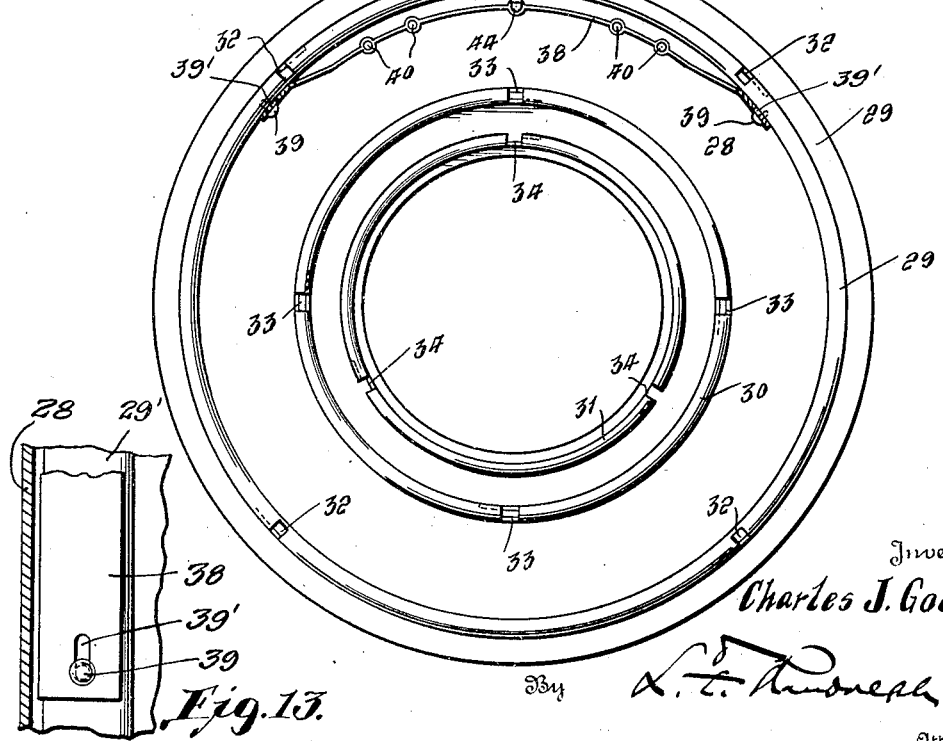
Fig. 11.
Fig. 13.
Inventor
Charles J. Goeske
By
Attorney May 5, 1942.  C. J. GOESKE  2,282,222
MOTOR VEHICLE WHEEL
Filed June 27, 1940  4 Sheets-Sheet 2

Inventor
Charles J. Goeske
By L. F. Rudolph
Attorney

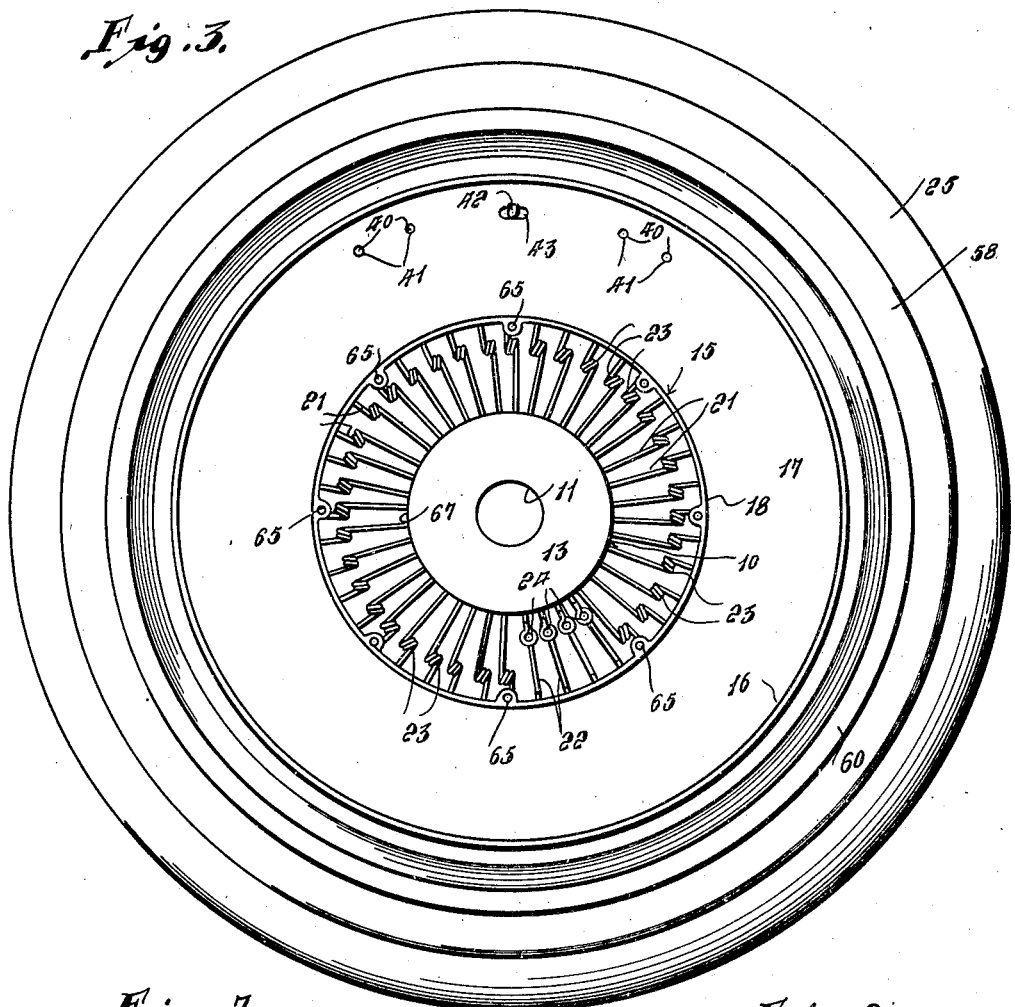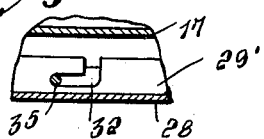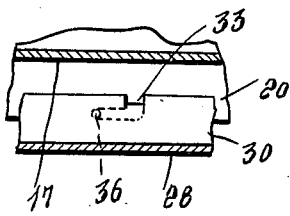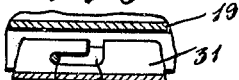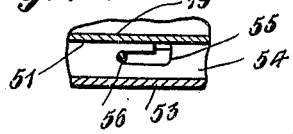

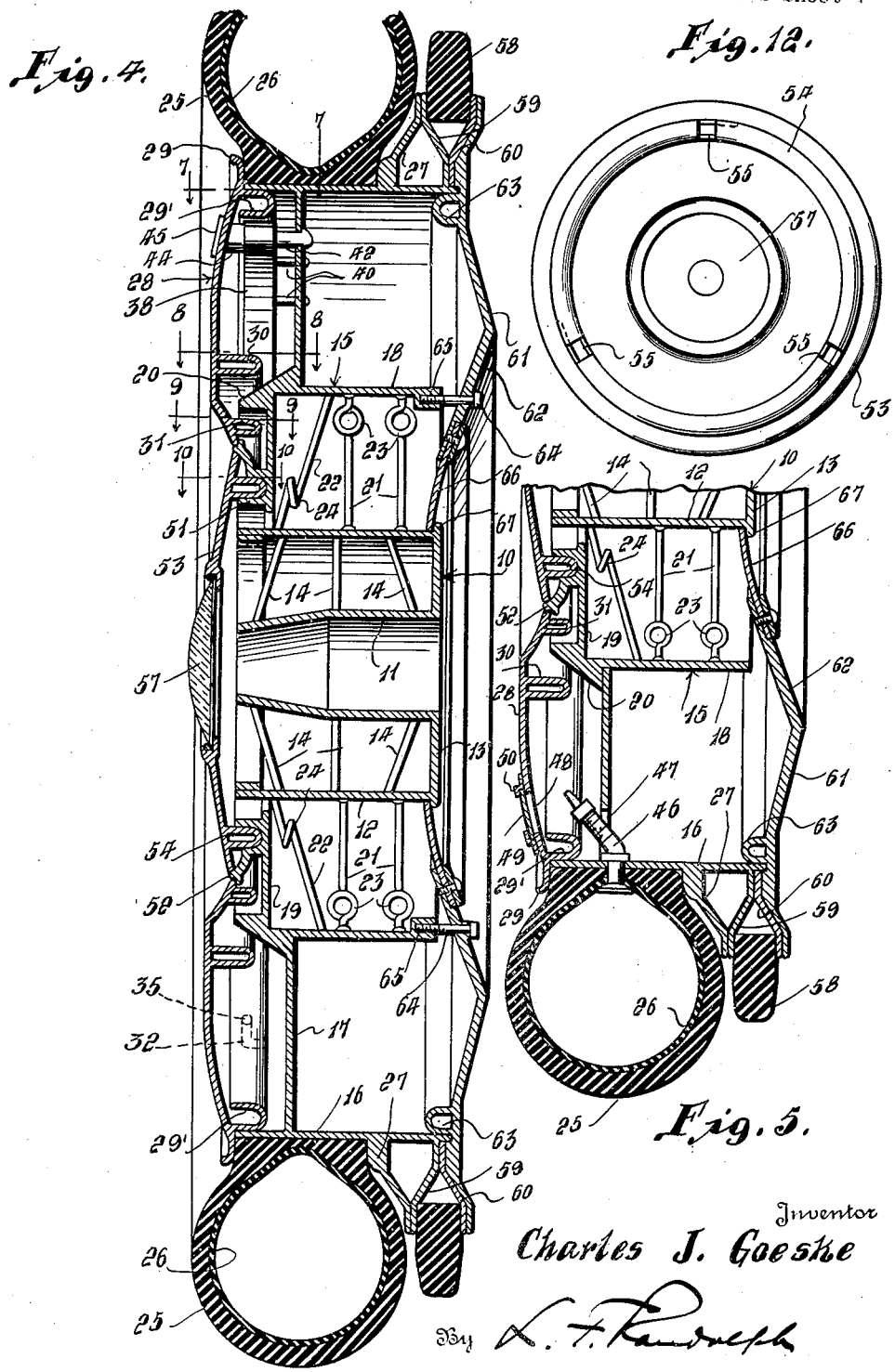

Patented May 5, 1942

2,282,222

UNITED STATES PATENT OFFICE 2,282,222

MOTOR VEHICLE WHEEL

Charles J. Goeske, Henryetta, Okla.

Application June 27, 1940, Serial No. 342,823

4 Claims. (Cl. 301—37)

This invention relates to a wheel construction primarily adapted for use on motor vehicles of any and all types, in any desired sizes and proportions according to particular needs.

One important object is to provide such a wheel with an emergency pilot tire or auxiliary tire, which will enable the vehicle to continue travel at least for a short while, following a puncture or deflation of the main tire, without removal of the latter and without subjecting it to the weight of the vehicle or in any wise injuring it, this feature also insuring safety by preserving the equilibrium of the car at the instant of loss of air since overturning is prevented. I find that this feature also dispenses with the necessity of employing a spare tire.

It is further aimed to provide a construction having a novel hub cap or means at that location, that cannot be lost from the wheel and is securely held against theft under lock and key, and which will glow or reflect light in order to apprize adjacent traffic and drivers of the proximity of the wheel thus serving as a marker to aid in safety; to provide a structure which is shock eliminating; to provide a structure which is rigid and will exclude water and mud; a construction wherein the parts may be effectively locked; a construction wherein the removal and replacement of a tire is facilitated and does not require distortion of the tire and liability to injury, and a construction having the rim free at one edge thereof in combination with a novel side plate having means supporting and reinforcing the same and also having means serving as a retaining flange for the tire.

The more specific objects and advantages will in part be pointed out hereinafter and otherwise become apparent from a consideration of the description following taken in connection with accompanying drawings illustrating an operative embodiment.

In said drawings:

Figure 1 is a front elevation of the wheel equipped with a tire;

Figure 3 is a rear elevation of the wheel with the rear side plate removed to disclose details;

Figure 4 is an enlarged diametric section through the wheel taken approximately on the line 4—4 of Figure 1;

Figure 5 is an enlarged diametric section taken approximately on the line 5—5 of Figure 1;

Figure 7 is a fragmentary detail section approximately taken on the line 7—7 of Figure 4;

Figure 8 is a fragmentary detail section approximately taken on the line 8—8 of Figure 4;

Figure 9 is a fragmentary detail section approximately taken on the line 9—9 of Figure 4;

Figure 10 is a fragmentary section approximately taken on the line 10—10 of Figure 4;

Figure 11 is an elevation of the front side plate looking toward the inner surface thereof, the ends of the bail being in longitudinal section to disclose the enlarged openings about the pivots of the bail;

Figure 12 is an elevation of the hub plate looking toward its inner surface, and Figure 13 is a sectional view taken substantially along the plane of the line 13—13 of Figure 6.

Figure 2:
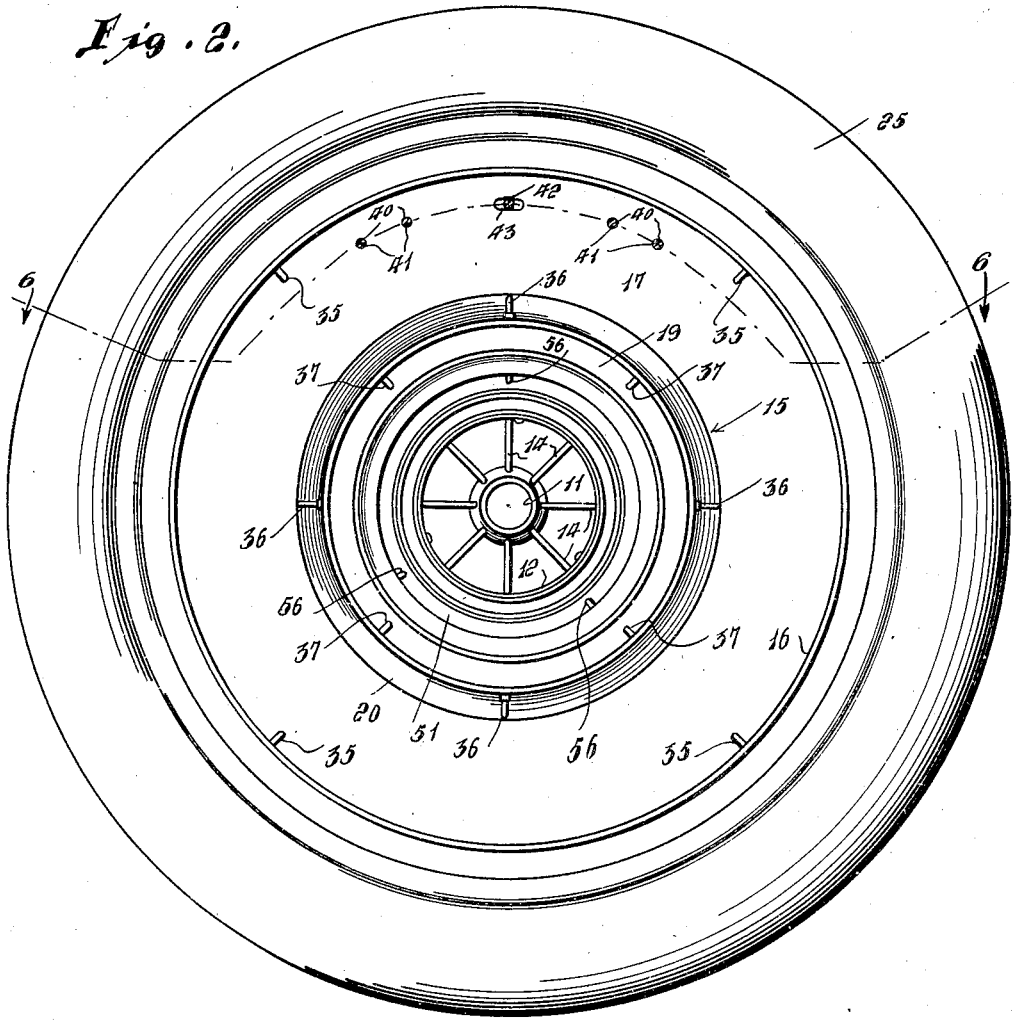
Figure 2 is a view similar to Figure 1 on a large scale but with front side plate and hub plate removed to disclose details.

Referring specifically to the drawings wherein like reference characters designate like or similar parts, the wheel includes a hub generally designated 10 of any suitable construction and configuration but preferably including a sleeve 11 adapted to be rotatably mounted upon a spindle or mounted fixedly upon the ends of axles or otherwise according to whether the wheel is used for propulsion or steering. Such hub includes a band 12 concentric with the sleeve 11 and joined integrally therewith by a wall 13 at the rear and by any suitable number of struts 14 integral therewith, arranged at angles or otherwise to provide maximum strength.

Concentric with the hub 10 and in spaced relation about the same is a web-like annular body generally designated 15. Such body comprises a rim 16, an inwardly extending web 17, integral with the rim and spaced from the side extremities thereof. An annular band 18 is concentric with the band 12 and rim 16 and integral with the web 17 and extending integrally and inwardly from the same closer to the front of the wheel than the web 17 is a web 19. At the juncture of the webs 17 and 19 and band 18, an integral reinforcement and annular rib 20 is provided.

The web-like body 15 has a movement relatively to the hub to absorb shocks during travel and to this end the opposite ends of radial spokes 21 are fastened to the bands 12 and 18. Inclined spokes 22, which have a bracing effect, are also connected at opposite ends to said bands and arranged in front of the spokes 21. The spokes 21 and 22 have limited resilience which is controlled by the appropriately located coils 23 and 24 thereof, respectively.

A pneumatic tire and tube as at 25 and 26 are removably mounted upon the rim 16 and the tire at the inner side bears against a retaining flange 27 which extends outwardly from and is preferably integral with the rim 16 and shaped to conform to the exterior of the tire casing. Such tire and tube are applicable and removable simply by pushing and pulling, and while deflated, since the outer edge of the rim 16 is free in the absence of a removable ring-like front side plate 28. This side plate 28 includes a marginal flange 29 serving as the other tire retaining flange. It is to be noted, that the front side plate 28 has an inwardly extending rib 29', integral therewith, and preferably of U-shape as shown which directly engages the undersurface of the rim 16 adjacent the free edge of the latter, in order to reinforce the same and provide a joint to exclude rain and mud.

Additional inwardly extending annular ribs are provided preferably integral with the plate 28 at 30 and 31.

Means are provided whereby the ribs 29', 30 and 31 have cam clamp engagement with the body which will provide a rigid structure with maximum exclusion of mud and water. To this end, said ribs 29', 30 and 31 are provided with bayonet slots 32, 33 and 34, respectively, as best detailed in Figures 7, 8 and 9. The said bayonet slots respectively receive and co-act with lugs 35, 36 and 37. The lugs 35 extend radially inwardly from the rim 16 and the lugs 36 and 37 extend radially from opposite sides of the ridge or reinforcement 20. It will thus be realized that the front side plate 28 is applicable through pushing movement toward the wheel when the entrances of the slots 32, 33 and 34 are alined with the lugs 35, 36 and 37 and after pushing inwardly, through rotation relatively to the remainder of the wheel.

Figure 6:
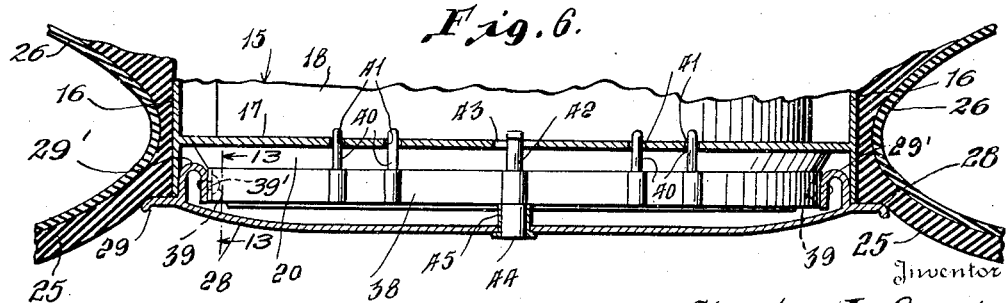
Figure 6 is a fragmentary cross section approximately taken on the line 6—6 of Figure 2 the bail and pins being unsectioned.

A novel means is provided whereby relative rotation of the front side plate 28 with respect to the remainder of the wheel is prevented and whereby such front side plate 28 may be locked to the web-like body 15 if desired. To this end, a bail 38 is provided as best shown in Figures 4, 6 and 11. This bail is loosely pivoted adjacent opposite ends on pivots for members 39 (occupying enlarged openings 39' of the bail) interiorly of and to the rib 29' (Figures 4, 6 and 11) for swinging outwardly on such pivots toward the wheel hub so that pins 40 carried thereby, may be in retracted relation to holes 41 in the web 17 when the front side plate 28 is turned with respect to the wheel. Such pins 40 are later adapted to be moved into the openings 41 through the pivotal movement of the bail 38. Also, when said relative movement of the side plate and wheel occurs, a hook shaped locking bolt 42 is retracted from an opening 43 in said web 17. Such bolt 42 is carried by a lock 44 which has limited sliding movement in a sleeve 45 mounted by the front side plate 28, it being clear that there is sufficient clearance between the lock 44 and sleeve 45 to enable operation of the lock, bolt 42 and the swinging movement of bail 38. It is also to be noted that the lock 44 is preferably key operated so that the hook bolt 42 will not only slide bodily with the lock but when engaged in the hole 43, may be rotated so that the hook will overlap the web and thus lock the front side plate in place.

The valve stem or inflation means for the pneumatic tube 26 is shown at 46 extending through an opening 47 in the web 17, so as to be accessible to inflating means projected through an opening 48 in the front side plate 28, which opening is normally closed by a slide 49 frictionally mounted by guides 50 on such front side plate 28.

Formed integral with web 19 on the outer side thereof is an annular channel portion 51 which has an extended flange 52 intimately abutted by the inner annular edge of the front side plate 28. Said flange 52 is also intimately abutted by the marginal edge of a detachable hub plate 53 which has a reinforcing integral inwardly extending rib 54, preferably of U-shape, occupying the channel member 51 and provided with any desired number of bayonet slots 55 detachably co-acting with studs 56 mounted by the channel portion 51. Centrally, said hub plate as at 57 has a part or surface of non-breakable glass or any equivalent, which will give a glow, luminous effect, be mirror like, or reflect light, so as to function as a marker and enable the distance of the wheel from adjacent traffic to be better estimated and gauged. A suitable lock 53', details not shown, is provided to secure the hub cap 53 in position on the wheel to prevent its theft.

A pilot or emergency tire is provided at 58 whose tread is materially inwardly of that of the tire 25 so that it will engage the ground only in the event the tire 25 becomes deflated. In the latter event, the tire 58 will support the wheel and vehicle enabling travel to a repair station or the like while the deflated tire remains in place, but without subjection to the weight of the wheel and vehicle. Such tire 58 may be made of any desired material for instance solid rubber and it may be retained by removable ring flanges 59 mounted on the rim 16, with the inner one abutting the flange 27 and with the outer one overlapped by the outer portion 60 of a detachable rear side plate 61 preferably of V-shape at 62 for reinforcement. Plate 62 preferably has an inwardly extending rib at 63, in direct supporting engagement with the adjacent portion of the rim 16. Said rib 63 is preferably integral with plate 61 and U-shaped. Plate 61 is detachable and may be held in place by any desired number of screws or bolts 64 passed therethrough and engaging screw threaded recesses 65 provided by band 18.

Said plate 61 is ring-like and at the inner edge carries an inwardly extending ring 66 of leather or other flexible material, to exclude foreign matter, and which is engaged behind an outwardly extending flange 67 on the wall 13 of the hub.

Various changes may be resorted to provided they fall within the spirit and scope of the invention.

I claim as my invention:

1. A wheel having a body, a rim thereon, a detachable side plate extending outwardly beyond the rim to serve as a tire securing flange, and a rib extending inwardly from said side plate interiorly engaging and reinforcing said rim, a bail pivoted at opposite ends to the inner surface of said rib for swinging into and out of the plane of the rib, and pin means carried by the bail for engagement with the body.

2. A wheel having a body, a rim thereon, a detachable side plate extending outwardly beyond the rim to serve as a tire securing flange, a rib extending inwardly from said side plate interiorly engaging and reinforcing said rim, a bail pivoted to the inner surface of said rib, and interengaging means between said bail and body operable through the pivotal movement of the bail.

3. A wheel having a body, a rim thereon, a detachable side plate extending outwardly beyond the rim to serve as a tire securing flange, a bail pivoted to the inner surface of said plate, interengaging means between said bail and body operable through the pivotal movement of the bail, and stud and bayonet slot connections between the body and said side plate.

4. A wheel having a body, a rim thereon, a detachable side plate extending outwardly beyond the rim to serve as a tire securing flange, a rib extending inwardly from said side plate interiorly engaging and reinforcing said rim, a bail surrounded by the rib, means pivoting said bail to the inner surface of said rib, said bail having a portion spaced from the rib whereby the bail may be swung on its pivot, and means carried by said portion for interengagement with said body.

CHARLES J. GOESKE.